United States Patent [19]
Halle et al.

[11] Patent Number: 6,020,385
[45] Date of Patent: Feb. 1, 2000

[54] PROCESS FOR THE PREPARATION OF MICROENCAPSULATED POLYMERS

[75] Inventors: Olaf Halle; Wolfgang Podszun; Robert Bloodworth, all of Köln; Werner Strüver, Leverkusen; Axel Ingendoh, Odenthal, all of Germany

[73] Assignee: Bayer Aktiengesellschaft, Leverkusen, Germany

[21] Appl. No.: 08/967,689

[22] Filed: Nov. 12, 1997

[30] Foreign Application Priority Data

Nov. 15, 1996 [DE] Germany .................. 196 47 291

[51] Int. Cl.⁷ ...................................... C08J 5/20
[52] U.S. Cl. ................... 521/31; 521/30; 521/32; 521/33; 526/217; 526/222; 526/227; 526/233; 526/336; 526/340; 526/340.1; 526/347
[58] Field of Search ................. 521/30, 31, 32, 521/33

[56] References Cited

U.S. PATENT DOCUMENTS

| 4,419,245 | 12/1983 | Barrett | 210/681 |
|---|---|---|---|
| 4,427,794 | 1/1984 | Lange | 521/28 |
| 4,564,644 | 1/1986 | Harris | 521/28 |
| 4,582,859 | 4/1986 | Lein, Jr. | 521/56 |
| 4,785,020 | 11/1988 | Boom | 521/32 |
| 5,519,064 | 5/1996 | Stringfield | 521/54 |
| 5,644,044 | 7/1997 | Darsow | |

FOREIGN PATENT DOCUMENTS

| 0 046 535 A2 | 3/1982 | European Pat. Off. . |
|---|---|---|
| 0 051 210 A2 | 5/1982 | European Pat. Off. . |
| 44 16 115 A1 | 11/1995 | Germany . |

OTHER PUBLICATIONS

Abstract of JP 04 239 001 A (Hatachi Chem Co. Ltd) Aug. 26, 1992.

*Primary Examiner*—Fred Zitomer
*Attorney, Agent, or Firm*—Norris, McLaughlin & Marcus

[57] ABSTRACT

Polymers of improved surface quality are obtained by polymerization of microencapsulated monomer droplets suspended in an aqueous phase if the monomer and/or the aqueous phase contain a polymerization inhibitor.

7 Claims, No Drawings

PROCESS FOR THE PREPARATION OF MICROENCAPSULATED POLYMERS

The invention relates to a process for the preparation of microencapsulated polymers by polymerisation of monomers enclosed in microcapsules.

Ion exchangers with as uniform a particle size as possible (called "monodisperse" below) have recently been gaining increasing importance because in many applications the more favourable hydrodynamic properties of an exchanger bed of monodisperse ion exchangers offer economic advantages. Monodisperse ion exchangers can be obtained by functionalization of monodisperse bead polymers. One of the possibilities for preparing monodisperse bead polymers is to produce monodisperse monomer droplets by atomizing monomers into a continuous phase and then curing these by polymerization. The formation of uniform droplet sizes can be assisted by vibrational stimulation; European Patent Specification 51 210 thus describes a process for the preparation of spherical monomer droplets of uniform particle size by vibrational stimulation of a laminar stream of monomer. If the monodispersity of the monomer droplets is to be retained during the polymerization, coalescence and the reformation of droplets must be precluded. A particularly effective method for preventing coalescence and reformation of droplets comprises microencapsulation of the droplets in accordance with European Patent Specification 46 535.

It has been found that the polymerization of microencapsulated monomer droplets does not always lead to bead polymers with smooth surfaces: bead polymers with rough and/or covered surfaces can form. For many applications, surface roughness or a surface covering is not a disadvantage, especially since a surface covering can be removed by after-treatment or is removed with the capsule wall during functionalization of the bead polymer to give the ion exchanger. For some applications, however, bead polymers with smooth surfaces are desired, thus, for example, for use of the bead polymers as a seed in a so-called seed/feed process. A "seed/feed process" is understood as meaning a process in which a polymer is swollen in the copolymerizable monomer and this monomer is polymerized, enlarged polymer particles being formed.

It has now been found that spherical polymers of improved surface quality (i.e. having smooth surfaces without a covering) are formed during polymerization of microencapsulated monomer droplets suspended in an aqueous phase if the monomer and/or the aqueous phase contain at least one polymerization inhibitor.

The invention thus relates to a process for the preparation of microencapsulated polymers by polymerization of the monomer droplets contained in microcapsules (suspended in an aqueous phase), characterized in that the aqueous phase contains at least one polymerization inhibitor. In addition to the monomer, the monomer droplets can also contain a crosslinking agent.

The microencapsulated polymers prepared according to the invention can be converted into ion exchangers by functionalization, directly or via the intermediate stage of polymer particles enlarged by a seed/feed process.

"Monomers" are understood as meaning compounds with one polymerizable C=C double bond, such as, for example, styrene, vinyl toluene, ethyl styrene, α-methylstyrene, chlorostyrene, chloromethylstyrene, acrylic acid, methacrylic acid, acrylic acid esters, methacrylic acid esters, acrylonitrile, methacrylonitrile, acrylamide, methacrylamide and mixtures of these compounds.

Styrene and mixtures of styrene and the abovementioned monomers are preferred.

Crosslinking agents which can be used are compounds having at least two, preferably two or three, polymerizable C=C double bonds. Preferred crosslinking agents include divinylbenzene, divinyltoluene, trivinylbenzene, divinylnaphthalene, trivinylnaphthalene, diethylene glycol divinyl ether, 1,7-octadiene, 1,5-hexadiene, ethylene glycol dimethacrylate, triethylene glycol dimethacrylate, trimethylolpropane trimethacrylate, allyl methacrylate and methylene-N-N'-bisacrylamide. The nature of the crosslinking agent can be chosen in respect of the later use of the polymer. Thus, for example, acrylate or methacrylate crosslinking agents are not very suitable if a cation exchanger is to be prepared from the polymer by sulphonation, since the ester bond is split under the sulphonating conditions. Divinylbenzene is suitable in many cases, in particular also for the preparation of strongly acid cation exchangers. For most applications, commercial divinylbenzene grades which also contain ethyl vinyl benzene in addition to the isomers of divinylbenzene, are adequate. The crosslinking agents are in general employed in amounts of 0.05–10, preferably 0.1–5, particularly preferably 0.1–1% by weight, based on the sum of monomer and crosslinking agent. The monomers should be largely insoluble in the aqueous phase. Monomers which are partly soluble in water, such as acrylic acid, methacrylic acid and acrylonitrile, are therefore preferably used as a mixture with water-insoluble monomers. It is also possible to reduce the solubility of the monomers in the aqueous phase by addition of salt.

Possible materials for the microencapsulation of the monomer droplets are those known for this purpose, in particular polyesters, naturally occurring and synthetic polyamides, polyurethanes and polyureas. Gelatin is particularly suitable as a naturally occurring polyamide. This is used, in particular, as a coacervate and complex coacervate. Gelatin-containing complex coacervates in the context of the invention are understood as meaning, above all, combinations of gelatin and synthetic polyelectrolytes. Suitable synthetic polyelectrolytes are copolymers with incorporated units of, for example, maleic acid, acrylic acid, methacrylic acid, acrylamide and methacrylamide. Gelatin-containing capsule walls can be hardened with customary auxiliaries, such as, for example, formaldehyde or glutarodialdehyde. Gelatin-containing capsule materials are preferred in the context of the invention.

The encapsulation of monomer droplets with gelatin, gelatin-containing coacervates and gelatin-containing complex coacervates is described in detail, for example, in European Patent Specification 46 535. The methods of encapsulation with synthetic polymers are known per se. Boundary condensation, in which a reactive component (for example an isocyanate or an acid chloride) dissolved in the monomer droplet is reacted with a second reactive component (for example an amine) dissolved in the aqueous phase is particularly suitable, for example, for this.

In addition to a crosslinking agent, the monomers to be encapsulated also contain initiators for initiating the polymerization. Initiators which are suitable for the process according to the invention are, for example, peroxy compounds, such as dibenzoyl peroxide, dilauryl peroxide, bis-(p-chlorobenzoyl peroxide), dicyclohexyl peroxydicarbonate, tert-butyl peroctoate, 2,5-bis-(2-ethylhexanoylperoxy)-2,5-dimethylhexane and tert-amylperoxy-1-ethyl hexane, and furthermore azo compounds, such as 2,2'-azobis-(isobutyronitrile) and 2,2'-azobis-(2-methylisobutyronitrile). The initiators are in general used in amounts of 0.05 to 2.5, preferably 0.1 to 1.5% by weight, based on the sum of monomer+crosslinking agent.

The monomers to be encapsulated can also contain so-called porogens, which generate a macroporous structure in the polymer. Organic solvents in which the polymer formed dissolves or swells poorly are suitable for this. Examples which may be mentioned are hexane, octane, isooctane, isododecane, methyl ethyl ketone and octanol.

The monomers contained in the capsules can also contain up to 30% by weight of crosslinked or non-crosslinked polymer, based on the encapsulated material. Preferred polymers are those of the abovementioned monomers, particularly preferably those of styrene.

The average particle size of the encapsulated monomer droplets is preferably 10 to 1000, in particular 100 to 1000 μm. The process according to the invention is suitable for the preparation of monodisperse polymers, in particular those which are described in European Patent Specification 46 535.

Polymerization inhibitors in the context of the invention are substances which slow down or completely suppress free-radical polymerization of compounds with polymerizable C=C double bonds.

The polymerization inhibitors to be used according to the invention can be inorganic or organic substances. Preferred inorganic inhibitors include hydrazine, hydroxylamine and nitro compounds, such as Fremy's salt (potassium nitrosodisulphonate), nitrites, such as sodium nitrite and potassium nitrite, salts of phosphorous acid, such as sodium hydrogen phosphite, sulphur-containing compounds, such as sodium dithionite, sodium thiosulphate, sodium sulphite, sodium bisulphite, sodium thiocyanate and ammonium thiocyanate, and peroxy compounds, such as hydrogen peroxide, sodium perborate or sodium percarbonate.

Preferred organic inhibitors include hydroxyaromatics, such as hydroquinone, hydroquinone monomethyl ether, resorcinol, pyrocatechal, tert-butylpyrocatechal, pyrogallol, p-nitrosophenol and condensation products of phenols with aldehydes, nitrogen-containing compounds, such as hydroxylamine derivatives, such as, for example, N,N-diethylhydroxylamine, N-isopropylhydroxylamine and sulphonated or carboxylated N-alkylhydroxylamine or N,N-dialkylhydroxylamine derivatives, hydrazine derivatives, such as, for example, N,N-hydrazinodiacetic acid, and furthermore also nitroso compounds, such as, for example, N-nitrosophenylhydroxylamine, N-nitrosophenylhydroxylamine ammonium salt or N-nitrosophenylhydroxylamine aluminium salt, unsaturated lactones, such as ascorbic acid, sodium ascorbate, isoascorbic acid and sodium isoascorbate, hydroxyketones, such as, for example, dihydroxyacetone, and sulphur-containing compounds, such as, for example, sodium isopropylxanthogenate.

In many cases it has proved advantageous if the polymerization inhibitors to be used according to the invention are soluble in the aqueous phase. "Soluble" in this connection means that at least 1000 ppm can be dissolved without residue in the aqueous phase at 70° C. This can often be influenced by suitable choice of the conditions: for example, the solubility of a phenolic inhibitor can be improved by a high pH.

The amount of polymerization inhibitor is chosen such that the polymerization of monomer or monomer and crosslinking agent outside the capsule wall is prevented. In addition to depending on the amount of polymerization inhibitor used, the amount of polymerization inhibitor needed also largely depends on the inhibitor activity and the solubility of the inhibitor in the aqueous phase. The optimum amount can easily be determined by a few experiments. The inhibitor content of commercially available crosslinking agent, which is in general between 0.001 and 0.01% by weight, based on the crosslinking agent, is not sufficient for the purposes of the present invention; however—together with the inhibitor additionally added—it contributes towards the desired effect. Customary amounts of polymerization inhibitor are in the range from 10 to 1000, preferably 10 to 500, in particular 10 to 250 ppm, based on the sum (aqueous phase+inhibitor).

Commercially available monomers and crosslinking agents can contain inhibitors for stabilization. However, the concentration is so low that the concentration in the aqueous phase needed for the invention is not reached, and the effect according to the invention does not occur.

The polymerization of the encapsulated monomer droplets to give the spherical polymer can expediently be carried out in the presence of one or more protective colloids and, if appropriate, a buffer system in the aqueous phase. Protective colloids include naturally occurring and synthetic water-soluble polymers, such as, for example, gelatin, starch, polyvinyl alcohol, polyvinyl pyrrolidone, polyacrylic acid, polymethacrylic acid and copolymers of (meth)acrylic acid and (meth)acrylic acid esters. Cellulose derivatives, in particular cellulose esters and cellulose ethers, such as carboxymethyl cellulose, methylhydroxyethyl cellulose, methylhydroxypropyl cellulose and hydroxyethyl cellulose, are also particularly suitable. Gelatin is particularly suitable as a protective colloid in the polymerization of monomer droplets encapsulated with gelatin or gelatin-containing complex coacervates. The amount of protective colloids used is in general 0.025 to 1.5, preferably 0.05 to 0.75% by weight, based on the aqueous phase.

The polymerization can be carried out in the presence of a buffer system. Buffer systems which adjust the pH of the aqueous phase to a value of between 14 and 6, preferably between 12 and 8, at the start of the polymerization are preferred. Under these conditions, protective colloids with carboxylic acid groups are present entirely or partly as salts. The action of the protective colloids is influenced favourably in this manner. Particularly suitable buffer systems comprise phosphates or borates. The terms phosphate and borate in the context of the invention also include the condensation products of the ortho forms of corresponding acids and salts. The concentration of phosphate or borate in the aqueous phase is 0.5 to 500 mmol/l, preferably 2.5 to 100 mmol/l.

The stirring speed during the polymerization is not very critical, and in contrast to conventional bead polymerization, has no influence on the particle size. Low stirring speeds which are sufficient to keep the microcapsules in suspension and to assist in removal of the heat of polymerization are used.

The volume ratio of encapsulated monomer droplets to aqueous phase is in general 1:0.75 to 1:20, preferably 1:1 to 1:6.

The polymerization temperature depends on the disassociation temperature of the initiator employed. It is in general 50 to 150° C., preferably 55 to 100° C. The polymerization lasts 0.5 to a few hours. It has proved appropriate to use a temperature program according to which the polymerization is started at a low temperature, for example 60° C., and the reaction temperature is increased as the polymerization conversion progresses. This satisfies the requirement of a reliable course of the reaction and a high polymerization conversion particularly well. After the polymerization, the polymer can be isolated by customary means, for example by filtration or decanting, and, if appropriate, dried, after one or more washes.

The material of the capsule wall is essentially on the surface of the bead polymer. If desired, this material can be removed by an after-treatment. Gelatin and gelatin-containing complex coacervates can easily be washed off with acids or alkalis.

In most cases, however, it is not necessary to wash off the capsule wall material, since it is in any case removed under the conditions for functionalizing the polymer to give ion exchangers.

The percentage data of the following examples are in each case based on the weight.

EXAMPLES

Example 1
Preparation of a Microencapsulated Polymer without a Surface Covering 1580 ml of deionized water are initially introduced into a 4 l glass reactor. 790 g of a microencapsulated mixture of 0.8% divinylbenzene (63% pure commercially available divinylbenzene isomer mixture in ethyl styrene), 0.75% dibenzoyl peroxide and 98.45% styrene are added, the microcapsule comprising a complex coacervate, hardened with formaldehyde, of gelatin and an acrylamide/acrylic acid copolymer. The average particle size is 231 µm. A solution of 2.4 g of gelatin, 4 g of sodium hydrogen phosphate dodecahydrate and 410 mg of N,N-diethylhydroxylamine (85% pure) in 80 ml of dionized water is added to the mixture, the mixture is stirred slowly and the polymerization is brought to completion by increase in the temperature, while stirring. The mixture is washed over a 32 µm sieve and dried. 760 g of aspherical, microencapsulated polymer with a smooth surface are obtained. The polymers look optically transparent; the average particle size is 220 µm.

Example 2
Preparation of a Microencapsulated Polymer without a Surface Covering The experiment is carried out analogously to Example 1, but 100 mg of N,N-diethylhydroxylamine (85% pure) are employed. 760 g of a spherical, microencapsulated polymer with a smooth surface are obtained. The polymers look optically transparent; the average particle size is 220 µm.

Example 3
Preparation of a Microencapsulated Polymer without a Surface Covering The experiment is carried out analogously to Example 1, but 60 mg of N,N-diethylhydroxylamine (85% pure) are employed. 760 g of a spherical, microencapsulated polymer with a smooth surface are obtained. The polymers look optically transparent; the average particle size is 220 µm.

Example 4
Preparation of a Microencapsulated Polymer with a Slight Surface Covering The experiment is carried out analogously to Example 1, but 30 mg of N,N-diethylhydroxylamine (85% pure) are employed. 760 g of a spherical, microencapsulated polymer with a slight surface covering are obtained. The polymers look optically opaque; the average particle size is 220 µm.

Example 5
Preparation of a Microencapsulated Polymer with a Heavy Surface Covering (Comparison)

The experiment is carried out analogously to Example 1, but without N,N-diethylhydroxylamine. 760 kg of a spherical, microencapsulated polymer with a heavily covered surface are obtained. The polymers look optically white; the average particle size is 220 µm.

Example 6
Preparation of a Microencapsulated Polymer without a Surface Covering The experiment is carried out analogously to Example 1, but 700 mg of hydroxylamine are employed instead of N,N-diethylhydroxylamine (50% pure). 760 g of a spherical, microencapsulated polymer with a smooth surface are obtained. The polymers look optically transparent; the average particle size is 220 µm.

Example 7
Preparation of a Microencapsulated Polymer without a Surface Covering The experiment is carried out analogously to Example 1, but 350 mg of resorcinol are employed instead of N,N-diethylhydroxylamine. 760 g of a spherical, microencapsulated polymer with a smooth surface are obtained. The polymers look optically transparent; the average particle size is 220 µm.

We claim:

1. Process for the preparation of microencapsulated polymers by polymerization of monomer droplets which are contained in micro capsules, wherein the aqueous phase contains at least one polymerization inhibitor in the amount of 10 to 1000 ppm, based on the total wt. (aqueous phase+ inhibitor).

2. Process according to claim 1, in which the monomer droplet contains styrene and a crosslinking agent.

3. Process according to claim 1, in which the polymerization inhibitor is an inorganic compound.

4. Process according to claim 3, in which the polymerization inhibitor is chosen from the series consisting of nitrogen compounds, salts of phosphorous acid, sulphur-containing compounds and peroxy compounds.

5. Process according to claim 1, in which the polymerization inhibitor is an organic compound.

6. Process according to claim 5, in which the polymerization inhibitor is chosen from the series consisting of phenolic compounds, nitrogen compounds, unsaturated lactones, hydroxy-ketones and sulphur-containing compounds.

7. Process for the preparation of ion exchangers by functionalization of the product obtained by the process according to claim 1.

* * * * *